Oct. 15, 1929. A. H. SHOEMAKER Re. 17,461

PNEUMATIC TIRE AND RIM CONSTRUCTION

Original Filed March 30, 1920

INVENTOR
Alvin H. Shoemaker
BY
Fred C. Matheny
ATTORNEY

Reissued Oct. 15, 1929

Re. 17,461

UNITED STATES PATENT OFFICE

ALVIN H. SHOEMAKER, OF SEATTLE, WASHINGTON, ASSIGNOR TO SEMITIRE COMPANY INC., OF SEATTLE, WASHINGTON, A CORPORATION OF WASHINGTON

PNEUMATIC TIRE AND RIM CONSTRUCTION

Original No. 1,510,709, dated October 7, 1924, Serial No. 369,960, filed March 30, 1920. Application for reissue filed July 15, 1926. Serial No. 122,703.

My invention relates to improvements in pneumatic tire and rim constructions and the object of my improvement is to provide a pneumatic tire and rim construction wherein the greater portion of the air from which the tire derives its resiliency and elasticity is contained within the rim instead of within the tire, the side walls common to pneumatic tires being dispensed with in my tire when the specific rim disclosed herein is used said rim on which the tire or tread is placed being extended to take the place of the usual side walls of the tire.

Another object is to provide a tire and rim structure in which the bead of the tire fits over the outside of the bead receiving portion of the rim and one that is constructed in such a manner that the expansive pressure of the air within the tire will cause the bead of the tire to be drawn tightly into contact with the bead receiving portion of the rim.

A further object is to provide a pneumatic tire and rim construction embodying a tire that may be readily placed on a one piece circular rim.

A still further object is to provide a tire that is cheap to construct, that is durable and wears well, and one that is possessed of the resilient properties required of a pneumatic tire.

A still further object of the invention is to provide a pneumatic tire of elastic material having transversely directed cords imbedded therein to provide extensibility in longitudinal directions only.

With the above and other objects in view the invention consists in the novel construction, adaptation and combination of parts of a tire and rim construction as will be more clearly hereinafter described and claimed.

In the accompanying drawings

Figure 1:
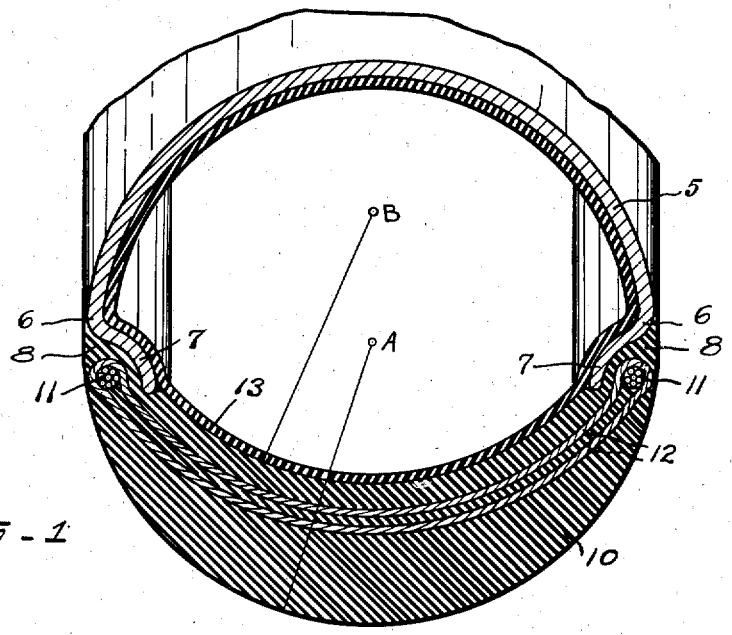
Figure 2:
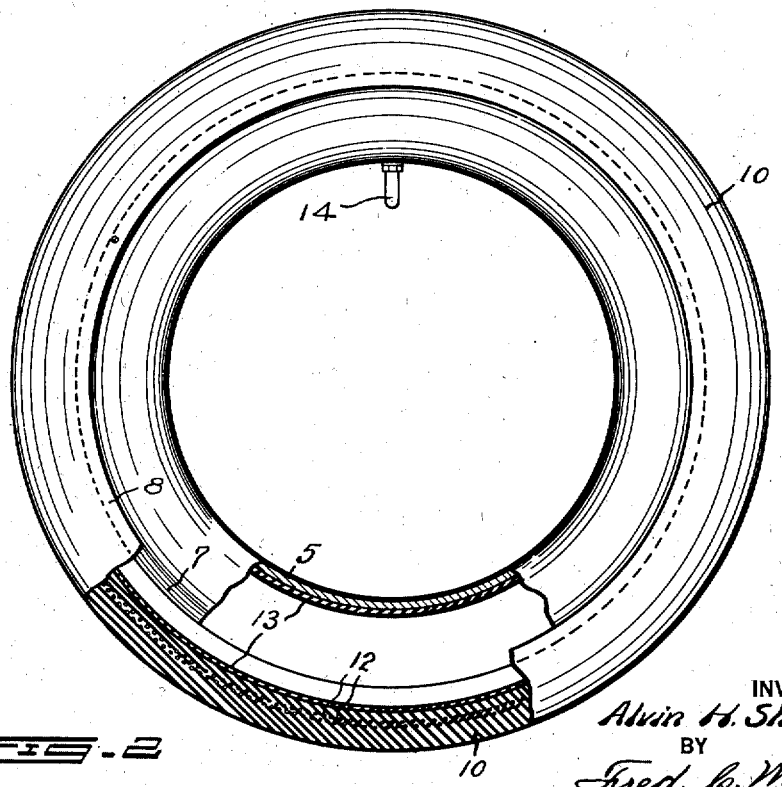

Fig. 1 is a view in cross section on a relatively large scale of a tire and rim constructed in accordance with this invention; and Fig. 2 is a view in side elevation on a reduced scale of such tire and rim, certain parts being broken away to better reveal the internal construction of the same.

Like reference numerals designate like parts throughout the several views.

Referring to the drawings the numeral 5 designates a circular rim that is adapted to be secured in any suitable manner to a wheel not shown.

The rim 5 is of substantially semicircular cross sectional shape as shown in Fig. 1 and the annular edges of the rim are bent inwardly by a relatively sharp bend as at 6 and terminate in curved portions 7 that are adapted to receive the overlapping bead portions 8 of a tire 10.

The tire 10 is provided with circular bead rings or cables 11 and has cords 12 that are embedded therein and preferably extend crosswise of the tire and at substantially right angles to the plane of such tire.

The cords 12 are preferably a single cable that is wrapped back and forth around the bead rings as shown in Fig. 1 as the tire is built up and become a part of the tire when the same is cured. Said cords extend directly across from one bead to the other, and there are no longitudinally or diagonally directed cords or fabric that will tend to restrict the tire from longitudinal extension.

An air tight inner tube 13 of the usual form may be disposed within the rim 5 and 7 as shown and may be provided with a valve 14.

The tire 10, as shown, is designed specifically to be mounted upon said specific type of rim, and is without side walls. Said tire is similar to the tread portion of an ordinary pneumatic tire that has its side walls removed and has the bead rings 11 incorporated therein.

The outer peripheral wall of the tire is substantially a semi-circle as seen in cross section in Fig. 1 with the center of curvature at A while the inner peripheral wall is arcuate shape and considerably less than a semicircle with the center of curvature at B so that the tire is relatively thick and heavy in the center and tapers toward the edges.

The cords 12 are embedded within the tire at a substantially constant distance from the inner wall of such tire so that as seen in Fig. 1 their center of curvature is the point B.

The rim 5 is preferably circular with a center of curvature at A and the tire which is drawn across the open periphery of the rim forms a somewhat flattened side for the semi-circular air chamber within the rim.

The bead rings 11 are endless circular metallic cables which are practically rigid or will expand only a very slight amount when the tire is placed on the rim, as shown, and is inflated. The pressure of the air which is equal in all directions will tend to expand the tire radially and will further tend to crowd outwardly or swell that portion of the tire between the two bead rings 11 thus causing the bead portions 8 of the tire to be drawn inwardly tightly against the curved bead receiving portions 7 of the rim, thereby preventing any danger of a blow out between the tire and rim.

When the bead portions 8 are in engagement with the bead receiving portions 7 of the rim the cords 12, which form nonelastic transverse binders, are drawn across the open outer portion of the rim on an arc having a center at B so that the nonelastic binders extending from bead to bead traverse considerably less than half of a complete circle described from the center B. The expansive pressure of the air within the tire and rim will tend to cause the non-elastic binder cords 12 to approach an exact semi-circular shape, and, owing to the fact that the ends of such cords are held by the non-elastic bead rings 11, this pressure will tend to draw the bead portions of the tire tightly inward against the bead receiving portions of the rim.

The tire may be placed on the rim by crowding one side of the rim into the tire far enough so that the opposite side of the tire may be slipped over the rim and then adjusting the tire all around so that the bead portions 8 of the tire fit the curved bead receiving portions of the rim.

When the tire is in use the tread portion thereof flexes and absorbs shock like the tread portion of an ordinary pneumatic tire, such tread portion being supported by and deriving its resilience from the relatively large volume of compressed air most of which is contained within the rim 5.

In this tire when used upon the specially formed rim described the side walls common to pneumatic tires are dispensed with and only a part that corresponds with and is similar to the tread portion of an ordinary tire is used, thus making a tire of this form relatively cheap in construction.

From the foregoing description taken in connection with the accompanying drawings the advantages of the construction and operation of my tire will be readily apparent, but, while I have described the principle of operation of the invention, together with the device which I now consider to be the best embodiment thereof, it will be understood that the structure shown is merely illustrative and that such changes may be made as are within the scope of the following claims.

What I claim is:

1. A tire and rim construction of the class described embodying a rigid rim having external bead receiving portions, and a tire of pliable material having non-elastic bead rings in the edges thereof and having reinforcing means extending between said bead rings and forming a substantially non-elastic transverse binder but leaving said tire free to expand circumferentially except for said bead rings, said transverse binder, as considered on any transverse section of the tire, being short enough so that, when the tire is inflated, it will form between said bead portions an arc of less than a semi-circle thereby causing said bead portions to be drawn inwardly against the rim.

2. In a tire and rim construction embodying a tire of elastic material having non-elastic bead rings in the edges thereof, reinforcing cords extending crosswise between said bead rings and forming a substantially transverse binder but leaving said tire free to expand longitudinally between said bead rings and a recessed rim having bead receiving portions arranged to fit within the bead portions of said tire and hold said bead portions apart, whereby when the tire is inflated, said cords will form, between said bead rings, arcs of less than a semi-circle and the bead portions of the tire will be drawn in against the bead receiving portions of the rim.

3. A tire and rim construction of the class described, embodying a rim having spaced apart bead receiving portions, and a tire of pliable elastic material having non-elastic bead portions arranged to rest on said bead receiving portions of said rim and having reinforcing means imbedded therein and extending between said bead portions and forming a substantially non-elastic transverse binder, but leaving said tire free to stretch circumferentially except for said non-elastic bead portions, said tire being substantially less than a circle in cross section when said bead portions rest on said bead receiving portions of said rim, and said tire and said rim co-operating to form an air cavity.

4. A tire and rim construction of the class described, embodying a rigid concave rim having spaced apart inclined bead receiving portions, and a tire of substantially semicircular cross section formed of pliable elastic material having non-elastic bead portions arranged to be tightened circumferentially by internal air pressure on said bead receiving portions of said rim and having reinforcing means imbedded therein and extending between said bead portions and forming a substantially non-elastic transverse binder, but leaving said tire free to stretch circumferentially except for said non-elastic bead portions.

Signed at Seattle, Washington, this 16th day of June, 1926.

ALVIN H. SHOEMAKER.